May 27, 1930. W. L. CONGDON 1,760,345
POWER DEVICE FOR APPLYING VEHICLE BRAKES
Filed July 6, 1928 2 Sheets-Sheet 1
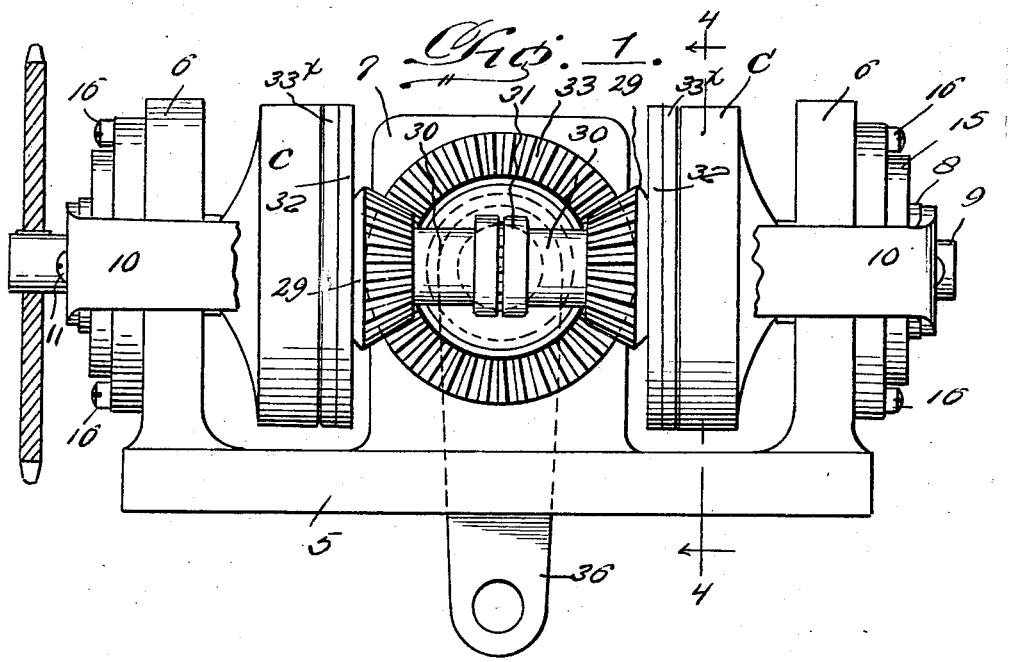
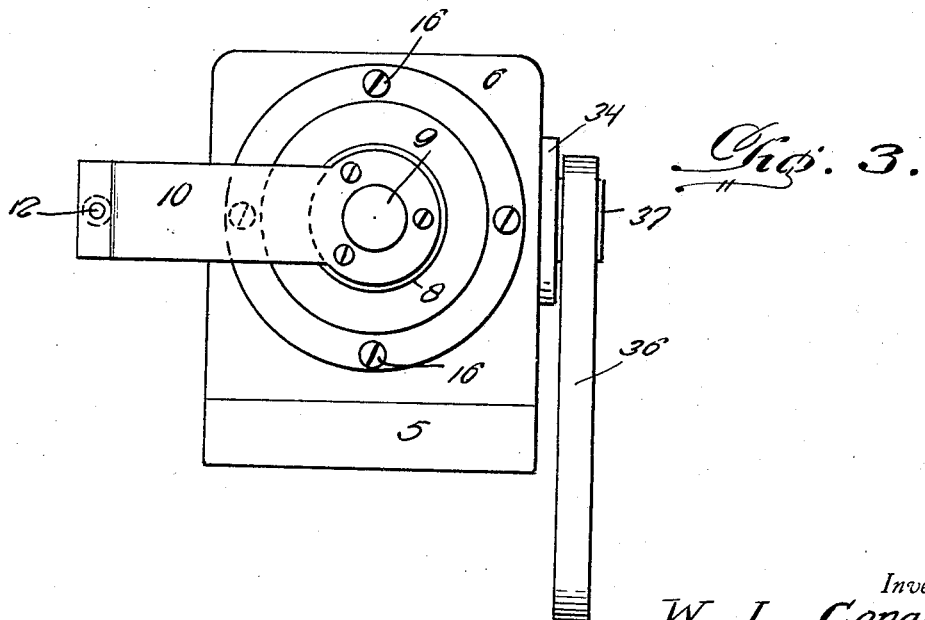
Inventor
W. L. Congdon,
By Clarence A O'Brien
Attorney May 27, 1930.  W. L. CONGDON  1,760,345
POWER DEVICE FOR APPLYING VEHICLE BRAKES
Filed July 6, 1928  2 Sheets-Sheet 2
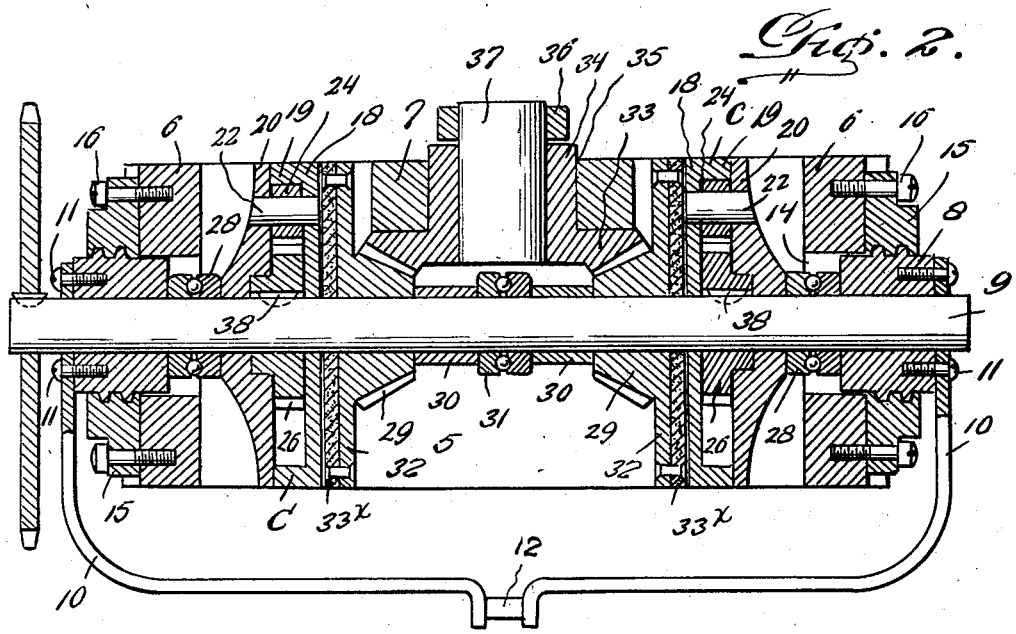
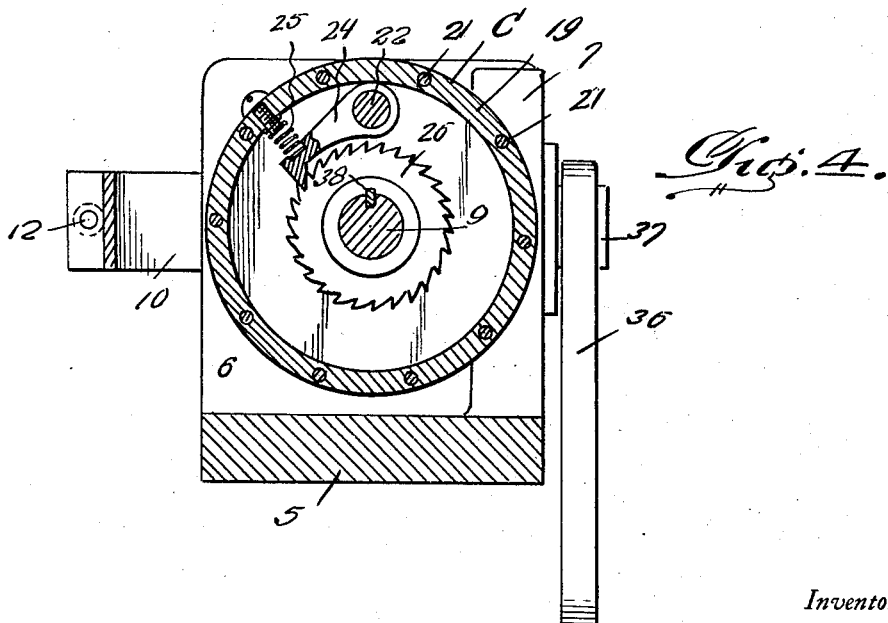
Inventor
W. L. Congdon,
By Clarence A. O'Brien
Attorney Patented May 27, 1930

1,760,345

UNITED STATES PATENT OFFICE

WALTER L. CONGDON, OF EL PASO, TEXAS, ASSIGNOR OF ONE-FOURTH TO JOHN H. WALDMAN AND ONE-FOURTH TO CHARLES R. CARTER, BOTH OF EL PASO, TEXAS

POWER DEVICE FOR APPLYING VEHICLE BRAKES

Application filed July 6, 1928. Serial No. 290,833.

The present invention relates to a power device for applying brakes to automobiles, trucks, or other vehicles and has for its prime object to provide a structure whereby such brakes may be applied with the minimum effort on the part of the operator.

Another very important object of the invention resides in the provision of a device of this nature which may be geared to the propeller shaft of a vehicle or any other suitable source of power and embodies means whereby the brakes will be properly applied regardless as to the direction of rotation of the shaft so that, for example, if the shaft is geared to the propeller shaft of an automobile or truck, the brakes may be effectively applied whether the automobile or truck is moving forwardly or rearwardly.

A still further very important object of the invention resides in the provision of this nature which is exceedingly simple in its construction, inexpensive to manufacture, strong and durable, easy to manipulate, compact and convenient in its arrangement of parts, thoroughly efficient and reliable in its use and operation, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is an elevation of the device embodying the features of my invention,

Figure 2 is a longitudinal section therethrough,

Figure 3 is an end elevation thereof, and

Figure 4 is a transverse section therethrough taken substantially on the line 4—4 of Figure 1.

Referring to the drawing in detail, it will be seen that the frame comprises a base plate 5 with lateral end extension plates 6 and an intermediate extension 7 at one side thereof. Bearings 8 are oppositely threaded in the end plates 6 so as to move toward and away from each other when they are simultaneously rocked.

A shaft 9 is journaled in the bearings 8 and may be geared in any suitable manner with the propeller shaft of a vehicle. If desired the shaft 9 may be operatively connected with any other suitable source of power.

Levers 10 are fastened to the outer ends of the bearings by screws 11 and have openings through which the shaft 9 extends. These levers are curved intermediate their ends toward each other and connected by a pin 12 or in any other suitable manner.

In order to thread the bearings 8 in the plates 6 I construct these plates 6 with openings 14 to receive the inner ends of the bearings and mount on the plates internally threaded pieces 15 by means of screw bolts 16 or in any other suitable manner and the bearings are threaded in these pieces 15.

Two casings C are rotatably mounted on the shaft 9. Each casing C includes a disk 18 with an annular lateral flange 19 on the periphery thereof and a disk 20 fastened to the flange by suitable elements 21. A pin 22 extends through each casing C off center thereof.

Oppositely disposed pawls 24 are rockable on the pins 22 and are spring pressed as at 25 toward ratchet wheels 26 keyed on the shaft 9 within the casings and having oppositely directed teeth for proper cooperation with the pawls 24.

Thus it will be seen that when the shaft 9 rotates in one direction one casing C is rotated therewith through its ratchet wheel 26 and pawl 24 while the other casing remains stationary since the pawl in the latter casing will slip over its respective ratchet 26.

Thrust bearings 28 are disposed on the shaft 9 between the inner ends of the bearings 8 and the disks 20 of casings C.

Beveled gears 29 are rotatable on the shaft and are held in spaced relation by spacing sleeves 30 about the shaft 9 and having therebetween a thrust bearing 31. These bevel gears 29 are provided with disk bodies 32 on which are riveted disks of brake lining material 33$^x$ for engagement by disks 18 of casings C. A gear 33 meshes with the gears 29 and is formed with a hub portion 34 rotatable in opening 35 of plate 7.

This hub portion 34 has a crank 36 connected therewith through the intermediacy of a stub shaft 37 fixed in the crank 36 and in the hub 34. The key means 38 for the ratchet wheels 26 on the shaft 9 permits these ratchet wheels to slide on the shaft a limited amount as will be apparent from an inspection of Figure 2.

Presuming for the purpose of example that the shaft 9 is operatively connected with the propeller shaft of an automobile and the crank 36 is operatively connected with the brake mechanism—

It will be seen that by rocking the lever structure 10 bearings 8 are rocked to move toward each other because of their threaded engagement in pieces 15 and therefore through the thrust bearings 28 the casings C will be moved toward friction disks 33×.

Only one of the casings will be rotating with the shaft 9 and this casing C which is rotating will impart similar rotation to the friction disk 33' with which it engages thereby rotating the corresponding gear 29 and rotating the gear 33× to swing the crank 36 for applying the brake.

Thus the brakes will be applied regardless as to the direction of rotation of the shaft 9 so that the device is just as effective when the automobile is backing up as when moving forwardly.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A power device of the class described for applying brakes comprising a rotating shaft, bearings on the shaft, means for simultaneously moving the bearings toward and away from each other on the shaft, casings rotatable on the shaft, ratchet means in the casing to cause one casing to rotate with the shaft when the shaft is rotating in one direction and to cause the other casing to rotate with the shaft when the shaft is rotating in the opposite direction, gears on the shaft between the casings to be frictionally engaged by the casings when the bearings are moved inwardly to move the casings toward the gears, means for holding the gears in spaced relation to each other and a gear meshing with said gears.

2. A power device of the class described for applying brakes comprising a rotating shaft, bearings on the shaft, means for simultaneously moving the bearing toward and away from each other on the shaft, casings rotatable on the shaft, ratchet means in the casing to cause one casing to rotate with the shaft when the shaft is rotating in one direction and to cause the other casing to rotate with the shaft when the shaft is rotating in the opposite direction, gears on the shaft between the casings to be frictionally engaged by the casings when the bearings are moved inwardly to move the casing toward the gears, means for holding the gears in spaced relation to each other, a gear meshing with said gears, a frame including a base plate having laterally extending end plates, means for mounting the bearings in the end plates and an intermediate plate on the main plate in which the last mentioned gear is journaled.

3. An apparatus of the class described comprising a frame, bearings operatively threaded in the frame and disposed in alinement with each other, a shaft journaled in the bearings, casings on the shaft, thrust bearings between the first mentioned bearings and the casings, pawl and ratchet mechanisms in the casings operatively connecting the casings with the shaft to cause rotation of one casing when the shaft rotates in one direction and to cause rotation of the other casing when the shaft rotates in the other direction, gears on the shaft, and opposed to and adapted to be frictionally engaged by the casings, a gear journaled in the frame and meshing with said gears and means for synchronously turning the bearings in a common direction.

4. An apparatus of the class described comprising a frame, bearings operatively threaded in the frame and disposed in alinement with each other, a shaft journaled in the bearings, casings on the shaft, thrust bearings between the first mentioned bearings and the casings, pawl and ratchet mechanism in the casing operatively connecting the casings with the shaft to cause rotation of one casing when the shaft rotates in one direction and to cause rotation of the other casing when the shaft rotates in the other direction, gears on the shaft, and a gear journaled in the frame and meshing with said gears, the gears on the shaft having friction disks connected therewith for engagement by the casings.

5. An apparatus of the class described comprising a frame, bearings operatively threaded in the frame and disposed in alinement with each other, a shaft journaled in the bearings, casings on the shaft, thrust bearings between the first mentioned bearings and the casings, pawl and ratchet mechanism in the casings operatively connecting the casings with the shaft to cause rotation of one casing when the shaft rotates in one direction and to cause rotation of the other casing when the shaft rotates in the other direction, gears on the shaft, a gear journaled in the frame and meshing with said gears, the gears on the shaft having friction disks connected therewith for engagement by the casings, levers connected with the first mentioned bearings and connected together for simultaneously rocking the first mentioned bearings to cause them to move toward or away from each other simultaneously.

In testimony whereof I affix my signature.

WALTER L. CONGDON.